United States Patent

[11] 3,598,308

| [72] | Inventor | Anthony F. Garcia, Jr. |
| | | 241 Polhemus, Atherton, Calif. 94025 |
| [21] | Appl. No. | 801,298 |
| [22] | Filed | Feb. 24, 1969 |
| [45] | Patented | Aug. 10, 1971 |

[54] MEANS FOR CALCULATING MARKET YIELD ON DISCOUNT BONDS
4 Claims, 6 Drawing Figs.

| [52] | U.S. Cl. | 235/88 |
| [51] | Int. Cl. | G06c 3/00 |
| [50] | Field of Search | 235/88, 83, 84 |

[56] References Cited
UNITED STATES PATENTS

| 2,642,224 | 6/1953 | Christiansen | 235/88 |
| 3,253,780 | 5/1966 | Stewart et al. | 235/88 |
| 3,282,501 | 11/1966 | Copeland | 235/88 |
| 3,358,920 | 12/1967 | Ringley | 235/88 |
| 3,360,196 | 12/1967 | Grega | 235/88 |

*Primary Examiner*—Richard B. Wilkinson
*Assistant Examiner*—Lawrence R. Franklin
*Attorney*—Robert B. Kennedy ABSTRACT: Means for calculating market yield on discount bonds comprising a graduated scale of numbers indicative of interest rates and a numerical table mounted for relative movement with respect to said scale. The table comprises a plurality of diverse, numerical scales indicative of differences between coupon and basic yield interest rates. A cursor having an index comprising a graduated series of numbers indicative of percentages is mounted for relative movement with respect to the graduated scale and table.

OFFERING SHEET OF ABC BROKER FOR JAN. 1, 1969

| RATING | AMOUNT | ISSUING BODY | COUPON | MATURITY | YIELD |
|--------|--------|--------------|--------|----------|-------|
| AA | $50,000 | LOS ANGELES COUNTY FLOOD CONT. | 3¾% | 03/01/80 | 4.90% |
| A | 25,000 | SAN MATEO CITY SCHOOL DISTRICT | 3¾ | 10/01/80 | 5.00 |
| BB | 10,000 | SAN JUAN UNION HIGH SCHOOL DIS. | 3.90 | 05/01/81 | 5.70 |

FIG. 2 — TABLE OF BASIC YIELDS FOR JAN. 1, 1969

FIG. 3 — TABLE OF YIELDS FOR BONDS OF 90 RATED QUALITY FOR JAN. 1, 1969

INVENTOR.
ANTHONY F. GARCIA JR.
BY
ATTORNEY

INVENTOR.
ANTHONY F. GARCIA JR.
BY
ATTORNEY

MEANS FOR CALCULATING MARKET YIELD ON DISCOUNT BONDS

BACKGROUND OF THE INVENTION

This invention relates generally to discount bonds and particularly to means for calculating market yields thereon.

When public entities such as states, counties, cities, municipalities and school districts wish to borrow money they frequently will issue bonds. These bonds bear specified, fixed interest until their date of maturity at which time the issuing body promises to retire the issue through redemption of the bonds. Each bond will typically have a set of interest coupons annexed thereto which may be individually detached in sequence and presented for payment of interest due at regular, recurrent intervals. This interest rate, which is known as the coupon rate since it is usually printed on the coupon itself, applies equally to each coupon. At the time of original issue the coupon rate will, of course, be predicated by market conditions and thus will equal the par or basic yield for bonds of like quality then issuing. Once issued, however, this coupon rate will normally begin to drift away from the basic yield of subsequent, original issues of like grade. This is due to normal changes in market conditions. In an inflationary economy, for example, interest rates tend to ascend. Thus should the issuing body attempt to continue issuing bonds at an interest rate which was fixed at a previous time, it would be confronted with an absence of lenders to purchase the issue due to the interplay of normal supply and demand factors. Therefore the basic yield of subsequent, original issues in an inflationary economy is ordinarily higher than that of prior, original issues.

The quality of a bond is ultimately dictated by the capability of the obligor to repay. There are several criteria by which this is measured. A maturity date far into the future, for example, is deemed more risky than one of short term. Past performance in redeeming outstanding obligations is another consideration. In the case of municipal corporations the tax base may also be considered in proportion to the aggregate outstanding obligations of the municipality. Each significant issuing body is comparatively rated by a service such as Moody or Standard and Poors which use designations such as AAA, AA, A and BBB, in order of descending grade or quality.

In addition to the new or original-issue bond market just described is that of the secondary-issue market. In the former case the issuing body usually deals directly with a syndicate of buyers whereas in the latter case transactions between bond holders and buyers are usually handled through bond brokers. Contrary to the situation in the stock exchange there rarely is a current "bid" and "ask" in print for such bonds due to the vast number of differing bonds which are outstanding at any particular time. In the case of stocks there is rarely more than one or two distinct issues for any single corporation. In the case of bonds however each bond issued by a particular issuing body will vary in some financial respect due to the fact that the money market itself is continuously undergoing change. Nevertheless, there are daily notices published such as The Blue List of Current Municipal Offerings which, instead of publishing bid and ask prices, prints basic information such as the principal sum offered, name of the obligor or issuing body, the purpose for which the issue was originally made, the coupon rate of interest, the maturity date, the basic yield for corresponding new issues and the name of the broker offering the discount bond. Such notices do, of course, aid in determining market value for listed bonds.

This situation results in bond brokers having to judge for themselves what the current market will bear on given secondary issues. In doing this a broker must take into account the quality of the bond, the year of maturity, current yields of similarly graded bonds in the new issue market, the tax-exempt status of interest income and capital gains taxes. Though basic yield for corresponding new issues is very useful this still does not account for several of these relevant factors which also include added costs for handling odd lots, costs or registration where the bond is not in bearer form, and the lack of current income due to the relatively low coupon yield. Although the basic yields of new issues have been tested through acceptance by lenders in buying the issue, those of discount issues have not. Thus these other factors must be considered in determining their market value.

After carefully considering the aforementioned factors a broker may decide that the secondary issue under consideration should bear 4.85 basis points gross which is to say 4.85 percent interest per annum before capital gain taxes. By referring to a basis book with the total loan principal offered, gross yield and maturity date in mind, a total bid in dollars is deduced.

Calculating total dollar bid information from gross yield is a simple matter. Computing gross yield is more complex though involving time-consuming computations frequently made under conditions of stress. For example, should a secondary issue market broker receive a telephone call from another broker or seller asking his bid on a large discount bond the broker called will quite naturally wish to respond as quickly and as accurately as possible. It should be understood that accuracy is absolutely essential in the bond market. As little an error as one-tenth of one percent in gross yield, for example, can result in a loss of several thousand dollars. This is true, of course, regardless of whether the error is attributable to one of judgment or arithmetic.

Accordingly, it is a general object of the present invention to provide means for calculating anticipated market yield on discount bonds.

More particularly, it is an object of the present invention to provide means for calculating market yield on discount bonds having a known coupon interest rate, basic yield and maturity date.

Another object of the invention is to provide means for calculating market yield on discount bonds having a known coupon interest rate, quality rating and maturity date.

SUMMARY OF THE INVENTION

Briefly described, the present invention is means for calculating market yield on discount bonds comprising a graduated scale of numbers indicative of interest rates. A numerical table is mounted for relative movement with respect to the scale and comprises a plurality of diverse, numerical scales indicative of differences between coupon and basic yield interest rates. A cursor is mounted for relative movement with respect to the graduated scale and table. The cursor has an index indicative of percentages.

BRIEF DESCRIPTION OF THE DRAWING

FIG. 2 is a table of basic yields as of a particular date.

FIG. 3 is a table of yields for bonds of predetermined quality rating for the same date as that of the table shown in FIG. 2.

DESCRIPTION OF THE PREFERRED EMBODIMENTS

Figure 1:
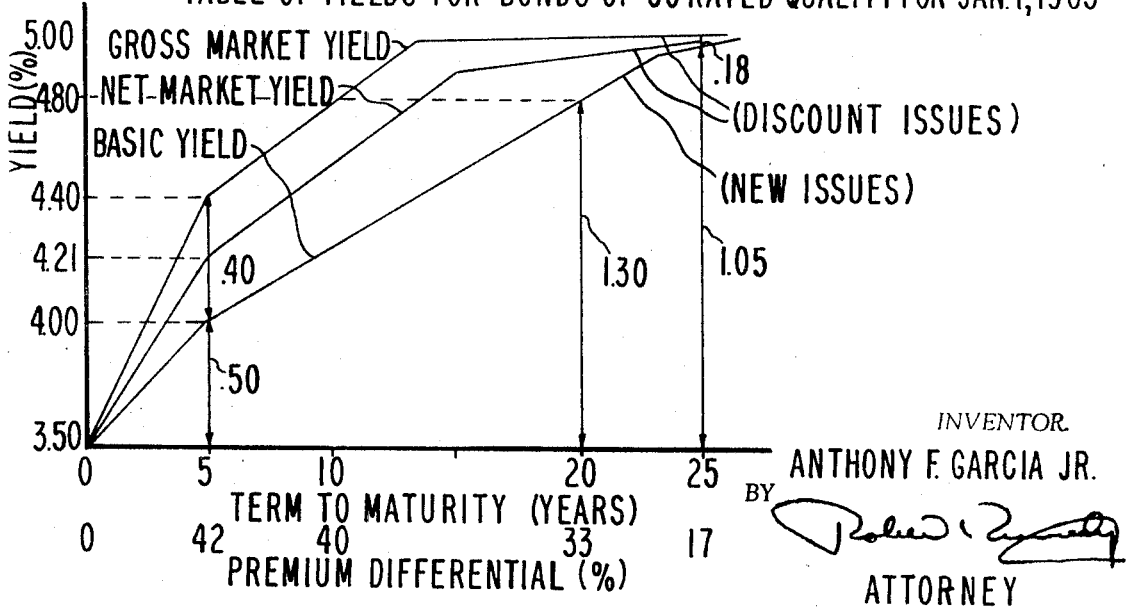
FIG. 1 is a sample daily offering sheet issued by a bond broker.

Referring now in more detail to the drawing, there is presented in FIG. 1 a sample daily offering sheet of discount bonds issued by a bond broker, bank or other investor. From left to right is given the quality rating of the issue as determined by a service organization such as Standard and Poors, the principal amount in dollars of the bonded indebtedness, the name of the issuing body, the rate of interest specified by the bond coupons and regularly paid to the bond holder by the issuing body, the date at which the bond is to mature, and the offered price in terms of yield. From the offered price may easily be calculated the principal sum for which the bond is offered. In the illustrated case of the $50,000 Los Angeles County Flood Control bond, for example, the issuing body pays 3 ¾ percent of $50,000 or $1,875 annually. For a 4.90 percent yield to be the same $1,875 the total dollar price must be substantially lower, depending on the term remaining until the actual $50,000 is to be paid. Thus, initially where the bond was worth $50,000, its value has since dropped which is to say discounted to a figure which can be found in standard yield-to-dollar conversion tables. This drop is attributable to the fact that interest rates have since risen. Thus investors today can demand and receive more than 3 ¾ percent interest on their investments in issues of similar quality. A bidder or his broker must, of course, decide if 4.90 percent is a good buy, and if not, what the discount issue should be worth. In the past this has occasionally been done intuitively be experienced brokers which method, though swift, has often resulted in figures at slight variance with actual market yields and thus erroneous. More often the market yield of the offered, discounted bond is calculated manually with pencil and paper which timely calculations involve several arithmetic operations with an attendant chance for mathematical error. Use of calculations embodying principals of the present invention such as that exemplified in FIGS. 4—6 avoid these problems.

To understand the principals by which the illustrated calculators shown in the drawing operate, reference should first be made to FIGS. 2 and 3. In FIG. 2 is shown a table of basic yields for a particular date. The table abscissa represents quality ratings of bonds in the primary market while the table ordinate represents maturity dates. Quality ratings are expressed numerically with 100 being arbitrarily chosen to represent the highest quality. Corresponding ratings by commercial service organizations are also shown just beneath the numerical scale. The basic yield of a bond will vary directly with term to maturity and inversely with quality. This is due to the fact that it is easier to predict with confidence what the financial health of a given issuing body of currently known solvency will be one year into the future, for example, rather than some 40 years hence. Thus, the longer the term to maturity the greater the risk and consequently the higher the rate of interest the market will bear. As to quality obviously the higher the quality the lower the yield will be. From the table we thus see that on Jan. 1, 1969 the basic yield for bonds having a quality rating of AA or 95 with a maturity date of 1990 was 4.55 basis points. Thus, an original issue on that date by an issuing body of 95 quality for bonds having a 22-year term should yield 4.55 percent.

FIG. 3 shows by the lower curve the basic yields which a new-issue bond of quality rating 90 will bear in the open market depending on the term or maturity date. As seen in FIG. 2 the basic yield is 3½ percent for a bond bearing a current maturity date, which is to say a maturity date falling within the next year, 4.85 percent for one bearing a 1990 maturity date, and so forth. The upper curve represents the gross market yield which a discount bond of the same quality will bear in the open discount market. One might wonder why a discount issue will bear higher interest than an original issue with both being of equal quality. Many factors account for this such as lack of current income, capital gain taxes to be paid and others, a combination of which will vary in arriving at a precise, predictable yield. The existence of this variance can be verified through market sampling.

There is a third, middle cure labeled "net market yield" which is derived directly from gross market yield which takes into account long term capital gain income taxes. It should be noted that though interest from many types of bonds is today tax exempt, such exemption applies only to interest income and not to capital gains made through sale of bonds themselves.

From FIG. 3 it may be seen that a bond of 90 rated quality having a maturity date five years hence has a basic yield of 4 percent. A discount bond with a 3½ percent coupon of the same grade and the same term to maturity however has a gross yield of 4.40 percent for a premium of 40 basis points over the new issue. Thus, the discount bond yields 40/90 or 44 percent more interest than the coupon yield. This premium of discount bonds over original-issue bonds of like grade is expressed along the abscissa of the graph shown in FIG. 3 adjacent the term-to-maturity line. The premium percentages are thus direct functions of term to maturity for given quality issues. Furthermore, this same functional relationship exists regardless of coupon rate, quality of current date. It was this discovery by applicant which helped him in inventing means for rapidly calculating market yields on discount bonds such as those exemplified in FIGS. 4—6.

Figure 4:
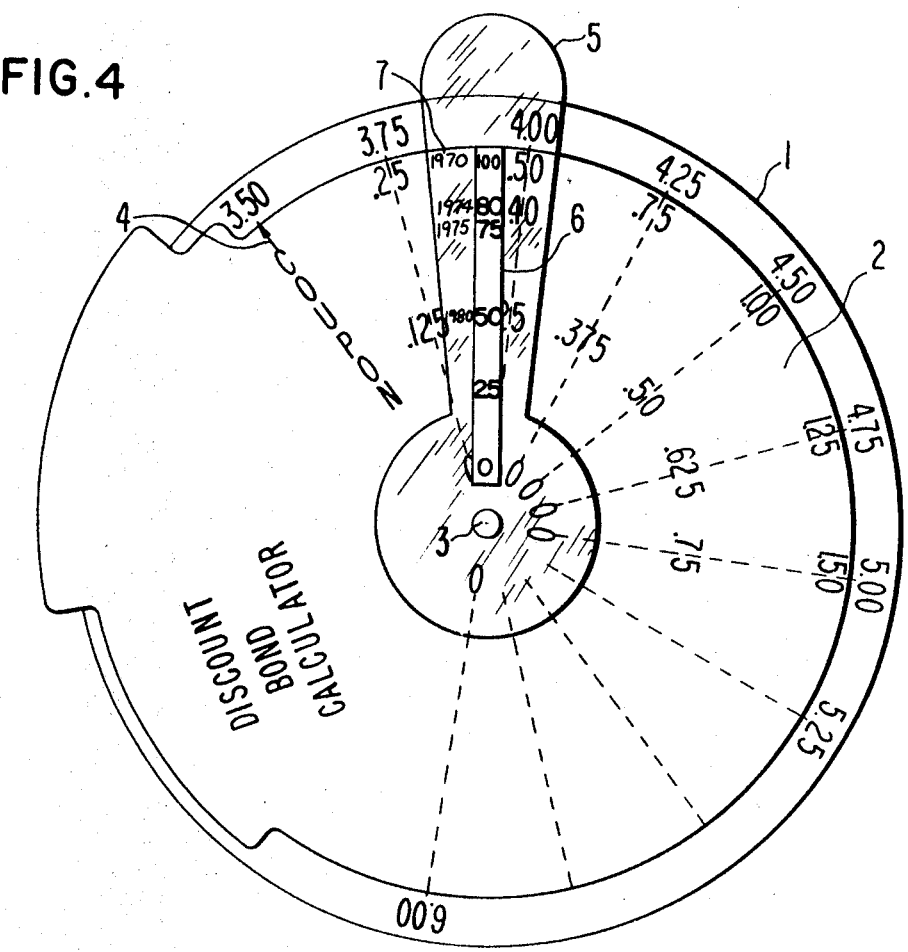
FIG. 4 is a frontal view in elevation of means for calculating market yield on discount bonds embodying principals of the present invention.

The embodiment illustrated in FIG. 4 comprises disc 1 which has a graduated scale of interest rates expressed in terms of basis points located about its periphery. Disc 2 is rotatably mounted atop disc 1 by means of pin 3. Printed upon disc 2 is a circular table consisting of a plurality of spaced columns of numbers and a pointer 4. The numerical indicia at the top of each column adjacent the scale of interest rates shown on disc 1 represents the difference in basis points between the interest rate thereabove on disc 1 and the interest rate pointed to on disc 1 by pointer 4. As adjusted in FIG. 4, 4.00 is the minuend and 3.50 the subtrahend on disc 1, the difference of 0.50 therebetween being shown on disc 2 just beneath the minuend. The numerals in each column are linearly graduated from the number at the top adjacent disc 1 to zero.

A transparent, plastic cursor 5 is rotatably mounted atop disc 2 by pin 3. Two scales of numbers 6 and 7 appear on the cursor. Scale 6 consists of a column of consecutive, even whole numbers equally spaced between 0 and 100 percent which are indicative of premium differential ratios. Scale 7 is a column of dates which commence at the top of the cursor with the current date and descend downwardly with subsequent dates. The spacing between dates is nonlinear with respect to time inasmuch as the premium differential ratios between basic and gross market yield are nonlinear as seen in FIG. 3. Furthermore, these dates are erasable insomuch as their correlation with premium differential ratios change with time and market conditions. It should be recalled that the table in FIG. 3 reflects market conditions as of a particular date. Therefore, should a user of the calculator wish to work with scale 7 rather than scale 6 he will have to adjust the dates from time to time to reflect current conditions.

To operate the calculator either disc 1 or 2 is rotated with respect to the other until arrow 4 points to the interest rate shown on disc 1 which corresponds to the coupon rate of the discount bond to be evaluated. Cursor 5 is then moved until the basic rate of yield appears thereunder just to the right of scale 6. Next the number on disc 2 aside either the maturity date on scale 7 or the premium differential ratio on scale 6, depending upon which is known to the user, is read. That figure is added to the basic yield rate appearing at the top of the column to reveal the market yield for the bond at that time. In the example shown in FIG. 4 a discount bond having a coupon interest rate of 3½ percent, a basic yield of 4 percent and a maturity date of 1974 should have a market yield of 4.00 plus 0.40 or 4.40 percent at the time of computation assumed here to be 1969. The market yield may either be computed in terms of gross or net market figures.

Figure 5:
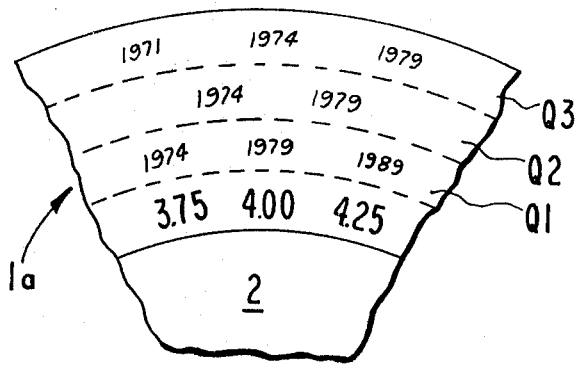
FIG. 5 is a fragmentary, frontal view in elevation of an alternative form of the means shown in FIG. 4.

FIG. 5 illustrates an alternative form which disc 1 may take which permits an operator to use the calculator of FIG. 4 without knowledge of basic yield but with knowledge of the quality rating of the offered bond. Note from FIG. 3 that if one knows any two of three facts, namely quality rating, basic yield and term-to-maturity he can graphically find the third fact. This, of course, assumes one has graphs for each quality rating or has drawn basic yield curves for each rating onto one graph. For example, if basic yield for a five-year term to maturity is known to be 4 percent, then the quality must be 90 as that matches the curve drawn in FIG. 3, a graph designated as being one for 90 quality-rated bonds. For higher quality bonds the slope of the basic yield curve will be less since the higher quality is less risky and thus will yield less. The converse is true, of course, for lesser grade issues.

In addition to the interest rates which appear at the bottom of disc 1a in FIG. 5 as on disc 1 in FIG. 4, there are three concentric, circular zones Q1, Q2 and Q3. These zones represent quality. Thus Q1 could be used for bonds of 100-rated quality, Q2 for those of 95 quality and Q3 for bonds of 90 grade. Into these zones are written, preferably with erasable pencil, years of maturity. Note in the illustration, for example, that in zone Q3 the year 1974 appears radially above the 4.00 yield figure. This positioning of the year comes from the graph in FIG. 3 which was drawn in 1969 for bonds of grade 90. A basic yield of 4 percent on that graph reveals a five-year term-to-maturity giving rise to the 1974 date. A computer with disc 1a may be operated in the same manner as previously disclosed except that after pointer 4 is set at the coupon rate, cursor 5 is moved till the maturity date rather than basic yield is just to the right of scale 6 if it is that figure plus quality rating which the operator knows rather than basic yield.

Figure 6:
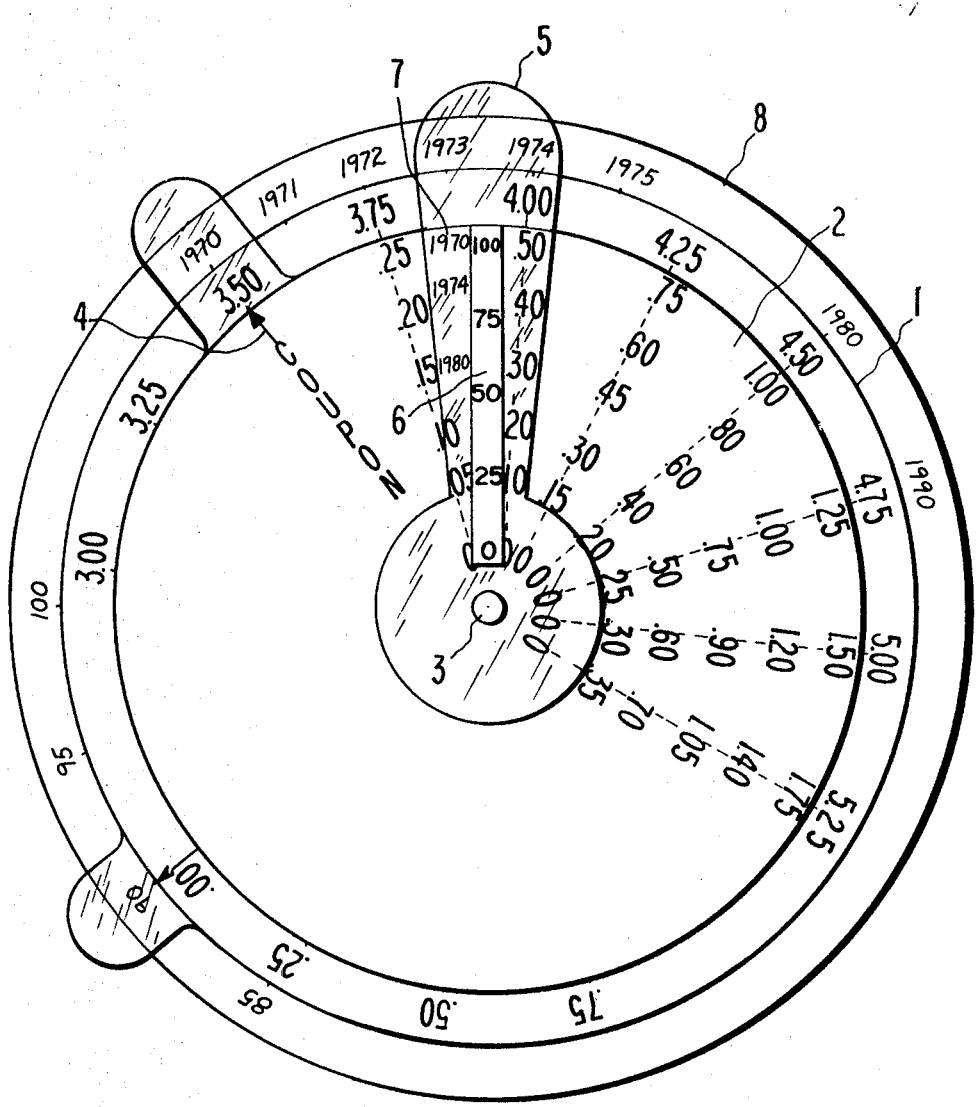
FIG. 6 is a frontal view in elevation of another embodiment of means for calculating market yield on discount bonds employing principals of the present invention.

In FIG. 6 is shown another embodiment of the invention which includes the members of the calculator shown in FIG. 4 with certain additions thereto including disc 8 which is disposed beneath disc 1. Disc 8 is rotatably mounted to the other discs by pin 3 and is adapted to receive numerical indicia by such means as pencil markings or the like. In this illustration several dates between 1970 and 1990 appear along the upper periphery of the disc. Along the lower left periphery appear erasable numera's 85, 90, 95 and the permanently marked number 100, all of which represent bond quality ratings. To the periphery of disc 1 has been added the values .00, .25, .50 and .75 which represent premium differential ratios. Quality code numbers 95, 90 and 85 have been located on disc 8 by indexing the arrow adjacent .00 on disc 1 with code number 100 on disc 8. Thus, at the time the illustrated code numbers were market, bonds of quality code rating 95 were yielding a premium differential ratio of 25 percent. The placement of the penciled dates on disc 8 is made by reference to basic yield tables.

By use of the embodiment shown in FIG. 6 one does not have to refer to an extraneous table of basic yields since that may be computed through the use of disc 8. To operate this embodiment disc 1 is moved with respect to disc 8 until the quality code of the bond at hand is indexed by the arrow adjacent .00 on disc 1. Next, disc 2 is rotated with respect to disc 1 to place arrow 4 pointing to the coupon rate of the bond. Finally, cursor 5 is moved to a position over the bond maturity date. The premium differential aside the corresponding maturity date on the cursor itself is then read out and added to the interest rate on disc 1 thereabove to produce the anticipated market yield. As positioned in the illustration here, it may be seen that a bond of 90 graded quality, having a coupon rate of 3½ percent and a 1974 maturity date should yield 0.40 plus 4.00 or 4.40 percent interest.

It should be understood that the above-described embodiments are merely illustrative of principals of the invention. Obviously, many modifications may be made to the specific examples shown without departing from the spirit and scope of the invention as set forth in the following claims.

What I claim is:

1. A discount bond market yield calculator comprising:
  a. a first disc having
    i. numerical indicia representative of a scale of bond qualities and adapted to receive
    ii. numerical indicia representative of a series of dates;
  b. a second disc mounted for relative movement with respect to said first disc and having
    i. a graduated scale of numerical indicia thereon indicative of a plurality of interest rates, and
    ii. a graduated scale of numerical indicia thereon indicative of a set of premium differential ratios;
  c. a third disc mounted for relative movement with respect to said first disc and with respect to said second disc and having tabular indicia thereon comprising a plurality of diverse sets of columnated numbers, each of said diverse sets of columnated numbers forming an arithmetic progression and having numbers at the top and bottom thereof with said top numbers being adjacent said graduate scale of numerical indicia indicative of a plurality of interest rates, and with the difference between top numbers of adjacent sets of columnated numbers equaling the difference between numbers in said graduated scale of numerical indicia indexed by said top numbers of adjacent sets of columnated numbers; and wherein the difference between any two numbers in one of said diverse sets of columnated numbers separated a linear distance is diverse from the numerical difference between any two numbers in any other set of columnated numbers separated by the same quantitative linear distance; and
  d. a cursor mounted for relative movement with respect to said first disc, to said second disc, and to said third disc, said cursor being adapted to receive numerical indicia representative of said series of dates.

2. Means for calculating market yield on discount bonds comprising:
  a graduated scale of numbers indicative of interest rates;
  a numerical table mounted for relative movement with respect to said scale and comprising a plurality of columnated, diverse, numerical scales indicative of differences between coupon and basic yield interest rates, each of said columnated scales having numbers at the top and bottom thereof with said top numbers being adjacent said graduated scale of numbers indicative of interest rates, and with the difference between the top numbers of adjacent columnated scales equaling the difference between numbers in said graduated scale indexed by said top numbers of adjacent columnated scales;
  means adapted to receive date indicia thereon representative of a plurality of bond maturity dates and mounted for relative movement with respect to said graduated scale of numbers indicative of interest rates and with said numerical table; and
  a cursor mounted for relative movement with respect to said graduated scale and table, said cursor having an index indicative of percentage.

3. The apparatus of claim 2 wherein
  said means adapted to receive date indicia thereon is also adapted to receive numerical indicia representative of a plurality of bond quality ratings; and wherein
  said apparatus further comprises means for locating said numerical indicia on said means adapted to receive date indicia thereon, said locating means comprising a second numerical scale representative of premium differential ratios mounted for relative movement with respect to said cursor and said means adapted to receive date indicia thereon.

4. A discount bond market yield calculator comprising:
  a lower disc having a graduated scale of numerical indicia thereon indicative of interest rates;
  an upper disc concentrically overlaying and rotatably mounted on said lower disc, said upper disc having tabular indicia thereon including a plurality of diverse sets of columnated numbers with the difference between any two numbers in one of said columnated sets separated a linear distance being diverse from the numerical difference between any two numbers in any other columnated set separated by the same quantitative linear distance;
  a bottom disc concentrically underlying and rotatably mounted to said lower disc, said bottom disc adapted to receive date indicia thereon representative of a plurality of bond maturity dates; and
  a cursor mounted to said upper, lower and bottom discs for relative movement with respect thereto.